UNITED STATES PATENT OFFICE.

DERICK H. FITCH, OF CAZENOVIA, NEW YORK.

ELECTROLYTE FOR GALVANIC BATTERIES.

SPECIFICATION forming part of Letters Patent No. 387,679, dated August 14, 1888.

Application filed January 12, 1888. Serial No. 260,557. (No specimens.)

*To all whom it may concern:*

Be it known that I, DERICK H. FITCH, a citizen of the United States, residing at Cazenovia, in the county of Madison and State of New York, have invented a new and useful Improvement in Galvanic Batteries, of which the following is a specification.

This invention has reference to and is an improvement upon the solution for galvanic batteries for which a patent was granted to me, numbered 361,004, and dated April 12, 1887. When battery-cells containing the solution therein described are excessively used, or used on that kind of service known as "closed-circuit" service, some crystals, which I believe to be spent residue, form on the carbon and zinc plates. These crystals are soluble in or are decomposed and converted into other compounds by muriatic or chlorhydric acid, and hence the addition of the proper quantity of this acid to the solution in the cell will dissolve or remove them. I believe that these crystals are zincate of ammonia, and are decomposed and converted into other compounds by the muriatic or chlorhydric acid as expressed in the following equation: $ZnO, NH_3 + 3\ HCl = ZnCl_2 + H_2O + NH_4Cl$, thus removing the crystals in an inexpensive way without interrupting the working of the battery, converting the oxide of zinc component of the crystals into the deliquescent chloride of zinc and the ammonia component into useful chloride of ammonium, and leaving no free acid in the solution to cause destructive chemical action or other injurious effect.

What I claim as my invention, and desire to secure by Letters Patent, is—

Muriatic or chlorhydric acid in connection or combination with the solution for galvanic batteries, made by dissolving chloride of ammonium and chlorate of potassium or chlorate of sodium together in water.

DERICK H. FITCH.

Witnesses:
N. KNIGHT,
WM. WATKINS.